(12) United States Patent           (10) Patent No.:     US 8,785,894 B2
     Linow                            (45) Date of Patent:     Jul. 22, 2014

(54) IRRADIATION DEVICE HAVING TRANSITION GLASS SEAL

(75) Inventor: Sven Linow, Darmstadt (DE)

(73) Assignee: Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 13/885,449

(22) PCT Filed: Oct. 31, 2011

(86) PCT No.: PCT/EP2011/005494
     § 371 (c)(1),
     (2), (4) Date: May 15, 2013

(87) PCT Pub. No.: WO2012/065688
     PCT Pub. Date: May 24, 2012

(65) Prior Publication Data
     US 2013/0234049 A1     Sep. 12, 2013

(30) Foreign Application Priority Data

Nov. 19, 2010   (DE) .......................... 10 2010 051 711
Oct. 13, 2011   (DE) .......................... 10 2011 115 841

(51) Int. Cl.
     *H01K 1/28*    (2006.01)
     *H01K 1/36*    (2006.01)
     *H01J 5/14*    (2006.01)
     *H01K 7/00*    (2006.01)

(52) U.S. Cl.
     CPC .. *H01K 1/36* (2013.01); *H01K 7/00* (2013.01); *H01J 5/14* (2013.01)
     USPC ....... 250/504 R; 313/112; 313/113; 313/579; 445/26; 445/28

(58) Field of Classification Search
     CPC ............ H01K 1/28; H01K 1/36; H01K 1/38; H01K 1/40; H01K 5/00; H01K 7/00; H01J 5/04; H01J 5/14; H01J 5/20; H01J 5/26; H01J 5/32; H01J 5/34; H01J 5/31
     See application file for complete search history.

(56) References Cited

U.S. PATENT DOCUMENTS 2,177,685 A    10/1939  Bol
3,211,938 A *  10/1965  Holcomb ...................... 313/113
                        (Continued)

FOREIGN PATENT DOCUMENTS

DE          663337 C     8/1938
DE         1489472 A1    4/1969
                        (Continued)

OTHER PUBLICATIONS

Int'l Search Report and Written Opinion issued Jun. 14, 2012 in Int'l Application No. PCT/EP2011/005494.

(Continued)

*Primary Examiner* — David A Vanore
(74) *Attorney, Agent, or Firm* — Panitch Schwarze Belisario & Nadel LLP

(57) ABSTRACT

An irradiation device is provided having a housing having an interior chamber and an infrared emitter arranged therein. The infrared emitter has an emitter tube made of high silica content glass having a round cross section and a defined outer diameter. Electrical connection elements are made of a metallic material and led out from the emitter tube through a seal. In order to provide the emitter with a long service life and potentially higher output, which is also suitable for being enclosed by a seal that separates the regions of different media, temperatures, or pressures, the emitter tube end also has a round cross section and the defined outer diameter. Between the electrical connection element and the emitter tube there is a seal containing at least one transition glass, which has a thermal expansion coefficient lying between that of the metallic material and that of the high silica content glass.

19 Claims, 2 Drawing Sheets

(56) References Cited

U.S. PATENT DOCUMENTS

| | | | |
|---|---|---|---|
| 4,034,330 A * | 7/1977 | Goto | 338/238 |
| 4,271,363 A * | 6/1981 | Anderson | 250/504 R |
| 4,287,554 A * | 9/1981 | Wolff | 362/218 |
| 4,354,717 A * | 10/1982 | Rech et al. | 445/28 |
| 4,413,205 A * | 11/1983 | Ooms | 313/579 |
| 5,003,284 A * | 3/1991 | Dieudonne | 338/237 |
| 5,157,758 A * | 10/1992 | Halberstadt et al. | 392/408 |
| 5,374,872 A * | 12/1994 | Balaschak et al. | 313/623 |
| 5,536,991 A * | 7/1996 | Parham et al. | 313/113 |
| 5,567,951 A * | 10/1996 | Baschant et al. | 250/504 R |
| 5,628,859 A | 5/1997 | Janin et al. | |
| 5,867,630 A * | 2/1999 | Kreuter et al. | 392/407 |
| 5,984,749 A * | 11/1999 | Nishibori et al. | 445/26 |
| 6,057,532 A * | 5/2000 | Dexter et al. | 219/553 |
| 6,106,628 A | 8/2000 | Takahashi | |
| 6,122,438 A * | 9/2000 | Scherzer et al. | 392/411 |
| 6,354,901 B1 * | 3/2002 | Bundo et al. | 445/26 |
| 6,399,955 B1 * | 6/2002 | Fannon | 250/504 R |
| 6,713,945 B2 * | 3/2004 | Fuchs et al. | 313/113 |
| 6,909,841 B2 * | 6/2005 | Linow et al. | 392/407 |
| 7,820,991 B2 * | 10/2010 | Bar et al. | 250/495.1 |
| 7,839,069 B2 * | 11/2010 | Nakanishi et al. | 313/493 |
| 8,210,889 B2 * | 7/2012 | Reith et al. | 445/23 |
| 2008/0129174 A1 * | 6/2008 | Schafer | 313/112 |
| 2009/0160310 A1 * | 6/2009 | Motoya et al. | 313/485 |
| 2011/0248621 A1 * | 10/2011 | Linow | 313/317 |
| 2011/0266948 A1 * | 11/2011 | Kim et al. | 313/578 |
| 2012/0319576 A1 * | 12/2012 | Cseh et al. | 313/579 |
| 2013/0234049 A1 * | 9/2013 | Linow | 250/492.1 |

FOREIGN PATENT DOCUMENTS

| | | |
|---|---|---|
| DE | 3124218 A1 | 3/1982 |
| DE | 102008063677 A1 | 7/2010 |
| DE | 102009052995 A1 | 7/2010 |
| EP | 0629488 A2 | 12/1994 |
| GB | 952939 A | 3/1964 |
| JP | 2000-182566 A | 6/2000 |

OTHER PUBLICATIONS

Office Action issued Feb. 15, 2012 in DE Application No. 10 2011 115 841.7.

Office Action issued Mar. 25, 2011 in DE Application No. 10 2010 051 711.9-54.

* cited by examiner

IRRADIATION DEVICE HAVING TRANSITION GLASS SEAL

CROSS-REFERENCE TO RELATED APPLICATIONS

This application is a Section 371 of International Application No. PCT/EP2011/005494, filed Oct. 31, 2011, which was published in the German language on May 24, 2012, under International Publication No. WO 2012/065688 A3 and the disclosure of which is incorporated herein by reference.

BACKGROUND OF THE INVENTION

The invention relates to an irradiation device comprising a housing having an interior chamber and an infrared emitter arranged in this interior chamber. The emitter has an emitter tube made of a high silica content glass and has a circular cross section and defined outer diameter. A ribbon- or coil-shaped heating filament is arranged in the emitter tube and provided with electrical connection elements made of a metallic material and guided out from the emitter tube via a seal. At least one of the emitter tube ends extends into an outer space separated in a fluid-tight manner from the interior chamber by a sealing element contacting the emitter tube on the outside.

PRIOR ART

Such an irradiation device is known from German published patent application DE 10 2008 063 677 A1. In this device an infrared emitter is arranged in a vacuum process chamber. The emitter tube ends are guided out from the vacuum process chamber, wherein O-rings are provided for sealing the vacuum process chamber. Within the emitter tube a heating coil is arranged, whose power supply is fed on both ends via a gas-tight seal in the form of a pinched section having molybdenum foil enclosed therein.

Pinched sections are basically disadvantageous. They are complicated to produce, and they limit the service life of the infrared emitter and its output, as discussed in more detail below.

For producing the pinched sections, pinching machines are used which have, for example, two burners rotating about the quartz glass tube to be pinched and two opposing pinching jaws. As soon as the quartz glass tube is softened, the burner rotation stops, so that the pinching jaws are moved past the burners against the quartz glass tube and compress this tube, in order to enclose in the pinched section the molybdenum film placed therein as well as the connection pins exiting on both ends.

The pinched sections have a certain longitudinal extent, which is given by the length of the film and on both sides of this film a region for the quartz glass seal; typical lengths of the pinched section are 25 to 40 mm. In practice, it is difficult to set up the metallic components of the pinched section, that is, the two-sided connection pins and the metal film, exactly flush or to fix the metal pin going outward exactly in the middle. Consequently, the connection wires or bases attached on the outside are to have large tolerances or corresponding base holders or mounts must have tolerances of a few mm. This makes space-saving, precise mounts or contacts for such emitters difficult.

In irradiation devices there is often the problem of sealing the interior chamber from the surroundings, for example if a high temperature or a pressure difference must be maintained in the interior chamber or if there are gases or liquids in the interior chamber that should not escape into the surroundings. In cases in which the infrared emitter penetrates the chamber walls, a seal must likewise be provided at the penetration point. This makes other problems noticeable due to the pinching.

When shaping the pinched section, this section is wider than the outer diameter of the quartz glass tube. This effect can indeed be avoided if a higher degree of deformation of the quartz glass tube can be accepted, but this leads to a higher reject rate in production. Seals on the outer periphery of the envelope tube therefore usually have play, in order to allow a somewhat wider pinched section to be able to pass.

The considerable plastic deformation of the quartz glass tube at the pinched ends progresses in the direction of the tube center—even if at a quickly decreasing degree. The seal on the outer periphery of the quartz glass tube, however, is realized most easily with a low-deformation outer periphery that is as round as possible. Therefore, the deformed area of the quartz glass tube cannot enter into the reactor space, which means a loss of effective emitter length.

The output of an infrared emitter also depends on the internal pressure. However, pinched sections cannot withstand high internal operating pressures of, for example, greater than $10^6$ Pa, which result from a filling pressure of more than $10^5$ Pa in the cold state (ambient temperature).

Another difficulty presents itself in regard to the sealing of a process space for infrared emitters having a filler gas containing halogen. This is used to counteract the evaporation of tungsten and thus the shortening of the service life. Here, however, the temperature in the interior of the infrared emitter does not fall below 250° C. during operation, because otherwise this would lead to the condensation of tungsten halides. Especially at risk in this respect are the ends of the emitter tube. To counteract too much cooling here, the goal is to produce particularly short emitter tube ends, which lead to high temperatures up to the emitter tube ends. The high temperatures, however, prevent the use of plastic seals in this region and also pose a danger to the service life of the pinched section, because the molybdenum film corrodes when it is continuously exposed to a temperature of greater than 250° C.

The output of infrared emitters is also limited by the relatively low current load capacity of the pinched sections. Especially for applications in a vacuum, where the maximum electrical voltage is strongly limited in order to prevent spark-overs, it would be advantageous to implement significantly higher currents than the typical 12 A to 20 A.

BRIEF SUMMARY OF THE INVENTION

Statement of Technical Object

The invention is therefore based on the object of providing an irradiation device having an infrared emitter having a longer service life and possibly higher output or output per length, which is also suitable for being surrounded by a seal that separates regions of different media, temperatures, or pressures. In addition, the structural length needed for the seal should be minimized as much as possible and should remain limited to what is functionally necessary.

General Description of the Invention

This object is achieved according to the invention starting with an irradiation device having the features described at the outset, in that the emitter tube end also has a round cross section and the defined outer diameter, and that between the electrical connection element and the emitter tube a seal is provided, which comprises at least one transition glass having a thermal expansion coefficient lying between that of the metallic material and that of the high silica content glass.

With the irradiation device according to the invention, an infrared emitter is provided in which a pinched section for the current feed-through is eliminated, and instead a glassy sealing mass is produced between the emitter tube and the electrical connection element. The transition glass used for sealing the emitter tube has a thermal expansion coefficient that lies between that of the emitter tube glass and that of the connection element. In this respect it involves a glass-metal compound in so-called "sandwich technology," which has been known for a long time from many branches of engineering, but has previously not been used for the purpose of a seal and a power feed-through in the emitter tube of infrared emitters. The disadvantages mentioned above and produced by the pinched section can be avoided. For other lamps than infrared emitters, for example for mercury vapor lamps, such gas-tight seals having at least one transition glass are known. For example, from German published patent application DE 663 337 A, a method is known for melting tungsten wire in an emitter tube made of quartz glass for a high-pressure mercury vapor discharge tube. For generating a gas-tight seal, the tungsten wire is melted in one or more transition glass layers having stepped expansion coefficients, wherein the expansion coefficients are adapted to that of the quartz glass or the tungsten wire. British published patent application GB 952 939 A is also directed toward a mercury vapor lamp having a tubular emitter tube made of quartz glass in which, for the gas-tight seal on the emitter tube ends, a transition glass is provided through which is guided a feed wire made of tungsten. In the emitter tube there is a linear filament made of tungsten whose ends are welded with a feed wire made of tungsten.

In contrast, the irradiation device according to the invention for irradiating an object is equipped with an infrared emitter having non-deformed ends on one side or both sides.

According to the invention, a housing is provided that has an interior chamber isolated from an outer space. In the interior chamber one or more infrared lamps are arranged. The object to be irradiated can be arranged in the interior chamber or outside of this chamber.

The interior chamber can have an inlet and an outlet for a coolant or a flushing or processing gas, for example, for generating constant irradiation conditions, so that the interior chamber can carry a flow of fluid.

For the irradiation device according to the invention, the infrared emitter extends through the walls of the interior chamber, wherein a sealing element is provided between the outer periphery of the infrared emitter and the chamber walls, wherein this sealing element separates the interior chamber and the outer space from each other in terms of fluid. The sealing element can be used simultaneously for the mechanical support and fixing of the infrared emitter.

By sealing the end or the ends of the emitter tube with the transition glass, a central current feed-through is made possible within a tight space and a plastic deformation of the emitter tube is prevented. This produces a space-saving, compact construction, especially for the current feed-through and the electrical connection on the outside and also a long service life of the infrared emitter even for a high output.

The heating filament is provided on both sides with connection elements for the electrical power supply. The current feed-through to the connection elements is realized through one end of the emitter tube, wherein the other end can be closed, or it is realized through both ends of the emitter tube. It is essential that the end of the emitter tube through which the current feed-through is realized has no deformation relative to the other areas of the infrared emitter, in particular, it has the same round cross section and the same outer diameter as the center part of the infrared emitter. This allows a simple sealing of the emitter tube with a sealing ring.

The emitter tube consists of a high silica content glass. This is understood to be quartz glass or so-called "Vycor" glass, as well as, in general, glass having an $SiO_2$ content of at least 90 wt.-%.

To ensure the desired centricity of the connection element, the sealing is constructed, for example, under the use of a glass turning machine-like device.

The production of the seal preferably comprises processing steps in which a deoxidized surface area of the connection element is coated with a peripheral layer made of an alkali-free glass, and a peripheral bead made of another alkali-free glass is then placed on the peripheral layer.

To ensure a good bonding and tightness of the sealing mass, the connection element that has been chemically cleaned and freed from oxides as much as possible is coated with a thin layer of alkali-free glass. This is characterized by a thermal expansion coefficient that fits the material of the connection element and a good bonding capability. On this, the actual sealing mass is deposited in the form of a peripheral bead or multiple peripheral beads one above the other. Starting from this bead, the connection element is then fused with the emitter tube and optionally with other transition glasses, usually under the formation of a pin-like transition.

In one preferred construction of the irradiation device according to the invention, it is provided that the infrared emitter is a shortwave infrared emitter.

A shortwave infrared emitter very quickly provides a high heating output, so that a quick change in temperature and a quick heating up, for example, of an object to be irradiated, are made possible. Shortwave infrared emitters generate especially high temperatures, which usually requires a closed emitter tube for protecting the heating element.

In one especially preferred embodiment of the infrared emitter according to the invention, the interior chamber contains a halogen-free filler gas.

The interior chamber is filled, for example, with argon or with another noble gas. Therefore, maintaining a high temperature at the region of the emitter tube end can also be eliminated, or the emitter tube or parts of the emitter tube can even be force-cooled. This allows the use of a seal in this area that can consist of a material that is not resistant to high temperatures as, for example, plastic.

The forced cooling can also act on the region of the emitter that comprises the heating filament, while the connection ends are separated from this cooled region by the seal.

In this context it has proven effective if the interior chamber of the emitter contains a getter substance, in particular niobium, zirconium, tantalum, phosphorus, barium, or compounds of these substances.

Such getter substances are suitable for binding reactive contaminants of the filler gas, such as oxygen, hydrogen, or carbon. This lengthens the service life of the heating filament.

In another preferred embodiment of the infrared emitter it is provided that the emitter tube contains a filler gas, such that an internal pressure of at least 1 MPa is established under operating conditions.

The pressure specifications refer to the state with the infrared emitter in operation, that is, at the operating temperature. Conventional infrared emitters having pinched sections here have a significantly lower internal pressure around 0.3 to 0.4 MPa. Due to the high internal pressure, on one hand, a comparatively high nominal output can be realized and, on the other hand, a higher internal pressure also causes a longer service life. An internal pressure in the cold state of greater than 0.2 MPa is not possible for infrared emitters having pinched sections, because these do not withstand the pressure over a long period due to the asymmetrically shaped pinched section.

The sealing can be realized between the inner wall of the emitter tube and the connection element. However, one embodiment of the infrared emitter has proven especially advantageous in which the emitter tube end has a peripheral end side face, wherein the sealing is realized between the connection element and the end side face.

The sealing mass of the seal here preferably runs in an arc between the lateral surface of the connection element and the end side face of the emitter tube. Therefore, the sealing mass is guided in the axial direction onto the end side of the emitter tube. On one hand, this makes it easier to produce the seal and, on the other hand, it counteracts the generation of forces that act in the radial direction on the emitter tube as much as possible.

The heating filament comprises, for example, carbon or tungsten. Preferably, the heating filament and the electrical connection elements are made of the same material, preferably from tungsten or a tungsten-based alloy.

Heating elements made of tungsten and tungsten-based alloys are characterized by a high temperature resistance and long service life and have proven effective for a long time in infrared emitters.

As an alternative, the connection element is constructed from molybdenum or a molybdenum compound. This material is also preferred for additional components in the interior of the infrared emitter, such as springs, clamps, holding elements, or adapters.

As the transition glass an alkali-free borosilicate glass may preferably be considered.

Borosilicate glasses are relatively simple to process at a temperature that is low compared with quartz glass and they are characterized especially by high chemical resistance.

It has proven effective when the sealing mass has two transition glasses.

The first transition glass is here allocated to the electrical connection component of the heating filament and has a thermal expansion coefficient that is less than that of the connection element. The second transition glass is allocated to the emitter tube and has a thermal expansion coefficient that lies between that of the emitter tube and that of the first transition glass.

It has also proven effective when the electrical connection element has a round cross section at least in the region of the seal.

The electrical connection element having round cross section leaves, toward the emitter tube, a ring-shaped gap that can be more easily sealed in comparison to other gap geometries and that, due to the axial symmetry, advantageously acts on the course of mechanical stresses within the seal.

The larger the cross section of the electrical connection element is, the higher the nominal output of the infrared emitter can be. A pinched section and the metal film encapsulated therein limit the current that can be transmitted. The infrared emitter according to the invention eliminates this limitation. With respect to the highest possible nominal output, the electrical connection elements preferably have a diameter of at least 1.5 mm, especially preferred at least 2.0 mm.

Another embodiment according to the invention provides that at least on one side, at least in the region of the provided seal, the emitter tube has, symmetric to the emitter axis, a diameter that is greater than the rest of the emitter tube, but both regions each consist of tubular sections of high parallelism and roundness, so that each seal is constructed as described above.

It has proven advantageous when several infrared emitters are arranged one next to the other in the housing and when a bus bar is provided for holding and for the electrical contacting of the infrared emitters in the outer space.

The infrared emitters are arranged in the housing one next to the other, wherein the emitter ends extend into an outer space on both sides or on one side. The outer space is located outside or inside the housing. In the outer space there are one or more bus bars. The bus bars are arranged, for example, in pairs so that the infrared emitters each extend between a pair of bus bars. They can be used for mounting, holding, and/or for the electrical contacting of one or more infrared emitters.

The use of the bus bars is especially preferred for an embodiment having an interior chamber that can be evacuated. For the free routing of current-carrying cables (wires) in an evacuated space, the maximum voltage is limited to approximately 80 to 100 V, because higher voltages can cause sparkovers. These sparkovers involve gas discharges that can form between regions of different potentials and, once ignited, tend to sustain themselves through evaporation of metals and thus can lead to considerable damage in the interior of a vacuum installation. To prevent this, in the invention the bus bar is arranged in a separate outer space that is filled with a gas. To avoid sparkovers between the bus bar and the surroundings, the outer space and the interior chamber are separated from each other, for example, by a non-conductive, heat-resistant plastic.

It has also proven especially advantageous if two bus bars are provided, wherein the first bus bar has a mount for a first base of the infrared emitter and the second bus bar has a mount for a second base of the infrared emitter and an opening whose opening width is at least as large as the outer diameter of the emitter tube in the direction of an infrared emitter longitudinal axis.

Two bus bars ensure a simple contacting and also a simple installation of the infrared emitters next to each other. An especially simple and quick installation and removal of the infrared emitters is ensured by the opening of the second bus bar. The infrared emitter is pushed through the opening of the second bus bar for the installation in the direction of the mount of the first bus bar, so that an electrical contacting and mechanical holding of the infrared emitter base in the first mount is ensured. To ensure a pushing of the infrared emitter, the opening width of the opening is selected to be at least as large as the outer diameter of the emitter tube. The second bus bar has a mount for the second base of the infrared emitter. Its opening then can be closed.

It has proven advantageous when the mount for the second base has an inner diameter that corresponds to the inner diameter of the opening.

A mount for the second base having an inner diameter that is adapted to the inner diameter of the opening, and thus of the emitter tube, allows the emitter tube to be pushed through the mount in the direction of its longitudinal axis. For this purpose, the inner diameter of the mount can be just as large as or larger than the inner diameter of the opening. Therefore, because the inner diameter of the mount corresponds to the inner diameter of the opening, it is achieved that the second base of the infrared emitter to be installed in the mount can pass both the opening and also passes exactly and with electrical contact in the mount of the second bus bar. In this way, a compact structural shape of the infrared emitter is ensured.

It has proven effective that one side of the electrical contacting is constructed as a star point of a star circuit or as a zero conductor.

For an electrical contacting that is constructed as a star point of a star circuit or as a zero conductor, the potential difference between the bus bar and the interior chamber is low enough that no sheathing is required for the prevention of sparkovers. The emitters can be contacted in the open.

In one especially preferred embodiment, the irradiation device is constructed as a mobile irradiation device for cosmetic purposes.

In the cosmetics industry, irradiation devices having infrared emitters are used, for example, for hair removal. For this purpose it is especially advantageous if the irradiation device can be moved onto the spot to be treated. Portable irradiation devices are suitable for this.

In this context it has proven effective if a cooling device is provided for the infrared emitter and an optical conductor is provided for the transmission of infrared radiation emitted by the infrared emitter.

The risk of skin burns is dependent, for example, on the radiation power of the infrared emitter, the length of exposure, and the skin type. A cooling device ensures a uniform radiation output for the infrared emitter and therefore reduces the risk of unforeseen temperature changes and thus the occurrence of skin burns. In addition, a cooling device in the form of a liquid layer can also reduce the percentage of skin-damaging radiation through its absorption properties, for example also the proportion of skin-damaging radiation is diminished.

An optical conductor is used for the targeted transmission and guidance of the generated infrared radiation to an irradiation spot. The optical conductor can have a rigid or flexible construction. For focusing the radiation, a reflector can be applied onto the housing or the housing itself could be constructed as a reflector.

In one variant of this embodiment it is provided that the optical conductor is part of the housing.

An optical conductor that is simultaneously part of the housing allows a compact structural shape of the irradiation device according to the invention. At the same time, a component of the housing can be eliminated, wherein this component is transparent for infrared radiation and additional radiation losses can occur on this component, so that a more energy-efficient irradiation device is obtained.

In another, likewise preferred embodiment of the irradiation device according to the invention, it is provided that the interior chamber has a mount for a substrate to be irradiated.

A mount for a substrate to be irradiated in the interior chamber of the irradiation device allows a direct irradiation of the substrate without the in-between arrangement of a material that absorbs infrared radiation and has the advantage that the distance between the infrared emitter and the substrate can be selected as small as possible. Both promote a high and efficient application of energy.

Here it has proven effective when the interior chamber has a construction that can be evacuated.

The irradiation device according to the invention is suitable, in particular, for irradiation in a vacuum. Due to the separation of the bus bars and the evacuated treatment chamber, there is no risk of electrical sparkovers.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

EXAMPLE 1

Figure 1:
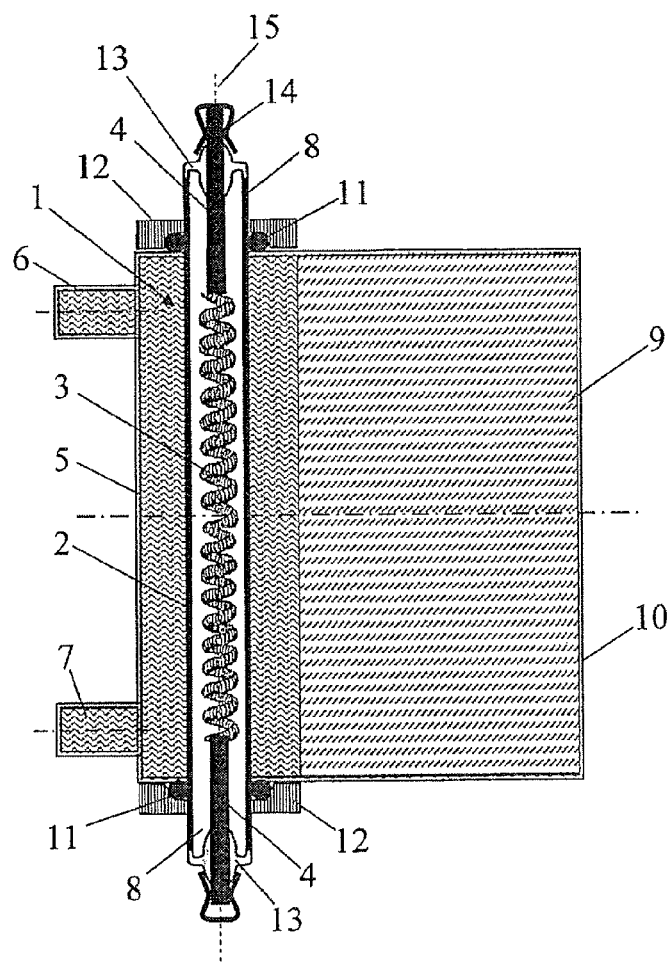
FIG. 1 is a schematic representation of a first embodiment of the irradiation device according to the invention having an infrared emitter for use in a handheld device for cosmetic irradiation purposes.

FIG. 1 shows schematically a handheld irradiation device for cosmetic purposes. It is equipped with an infrared emitter 1, wherein this involves a shortwave IR emitter having a nominal power of 250 W.

The infrared emitter 1 has an axially symmetrical emitter tube 2 made of quartz glass having a round cross section and an outer diameter of 10 mm and a length of 100 mm. The ends of the emitter tube 2 are not deformed and have the same cross section and diameter as the middle part of the emitter tube 2.

The emitter tube 2 encloses an interior chamber gas-tight, wherein a coil-shaped heating filament 3 made of tungsten having a (heated) length of 50 mm is arranged in this interior chamber and this interior chamber is filled with argon (without halogen additives). The ends of the heating coil 3 are each welded with a round electrical connection pin 4 having an outer diameter of 2 mm, also made of tungsten. The connection pins 4 are led out from opposing open end sides of the emitter tube 2 each over a length of 10 mm. Via each of these connection pins 4, a contact sleeve 14 made of stainless steel is fixed by hard solder. Other sleeve materials that are heat resistant and have low contact resistance values, such as nickel, copper alloys, or gold-plated elements, can also be used.

The infrared emitter 1 is water-cooled and for this purpose surrounded coaxially by a housing 5 made of aluminum, which is provided with a water inlet 6 and a water outlet 7. The inner walls of the housing 5 are polished and serve as reflectors, so that the largest possible percentage of IR radiation that enters into the water-flushed region from the infrared emitter 1 is led onto an optical conductor bar 9 that is made of glass and penetrates into the housing 5 in a water-tight way, which leads this radiation by total reflection to a beam outlet window 10 of the housing 5, where it can be used for the medical or cosmetic treatments.

The (non-heated) ends 8 of the infrared emitter 1 project out from the housing 5 and are sealed relative to the interior chamber by an O-Ring 11 made of Viton®. For this purpose, on both ends of the housing walls there are provided contact plates 12 that center the O-ring 11 and press against the emitter tube 2. The O-rings 11 are thus used simultaneously for the mechanical support and fixing of the infrared emitter 1. For the installation, the infrared emitter 1 can be pushed from one end into the seals.

To produce the seal 13, the connection pins 4 are cleaned in acid, and this removes any oxide layer. On the oxide-free connection pins 4, a thin layer of alkali-free borosilicate glass is applied, which is available on the market under the designation "Glass 8487" by Schott A G. The layer thickness is approximately 1/10 of the diameter of the pin 4, that is, approximately 0.2 mm. Then, a peripheral bead made of the same glass is placed. This bead is then connected to the end side of the emitter tube 2 on a glass turning machine by placement of additional glass and by the formation of a coupling-shaped transition 13, first on one side and then on the other side. Here, great attention must be paid to the correct positioning of the emitter tube 2 and the first connection pin 4, and also for the connection of the second pin 4 to the emitter tube 2, wherein now additionally the necessary tension must also be applied to the coil mounted between the pins 4.

The ring-shaped bottom side of the coupling-shaped transition 13 here impacts on the end side of the emitter tube in a straight line in the direction of the longitudinal axis 15. The connection pin 4 projects through the center of the "coupling" of the transition and is surrounded on both sides by a sleeve-shaped layer of the sealing mass. In this way, radial tensions are largely avoided on the emitter tube 2 during heating and cooling.

The sealing glass used has a thermal expansion coefficient of $3.9 \times 10^{-6} \, K^{-1}$, which is thus greater than that of quartz glass (approximately $0.6 \times 10^{-6} \, K^{-1}$) and less than that of tungsten, which is approximately $4.5 \times 10^{-6} \, K^{-1}$ (each determined according to ISO 7991 in the temperature range of 20° C. to 3000° C.).

Because the emitter tube 2 has no pinched ends and bases, the electrical contacting of the connection pins 4 is realized by typical plug-in, clamp-on, screw-in, or crimped contacts outside of the housing 5 in air and in the direct vicinity of the water-cooled region, so that a compact structural form of the device is achieved. The water cooling ensures that the surface temperature of the infrared emitter increases no more than approximately 60° C. during use and also that the temperature does not exceed 150° C. in the region of the non-cooled current feed-throughs.

EXAMPLE 2

In general, there is only a limited space available for installations in the evacuated region. Indeed, bus bars can be placed in isolated or gas-filled, separate spaces. However, it is difficult to connect the emitters to these bus bars, such that no sparkovers are produced. The gaps of the seal must also be designed with very tight tolerances, in order to prevent the penetration of sparkovers or the formation of surface discharges.

Figure 2:
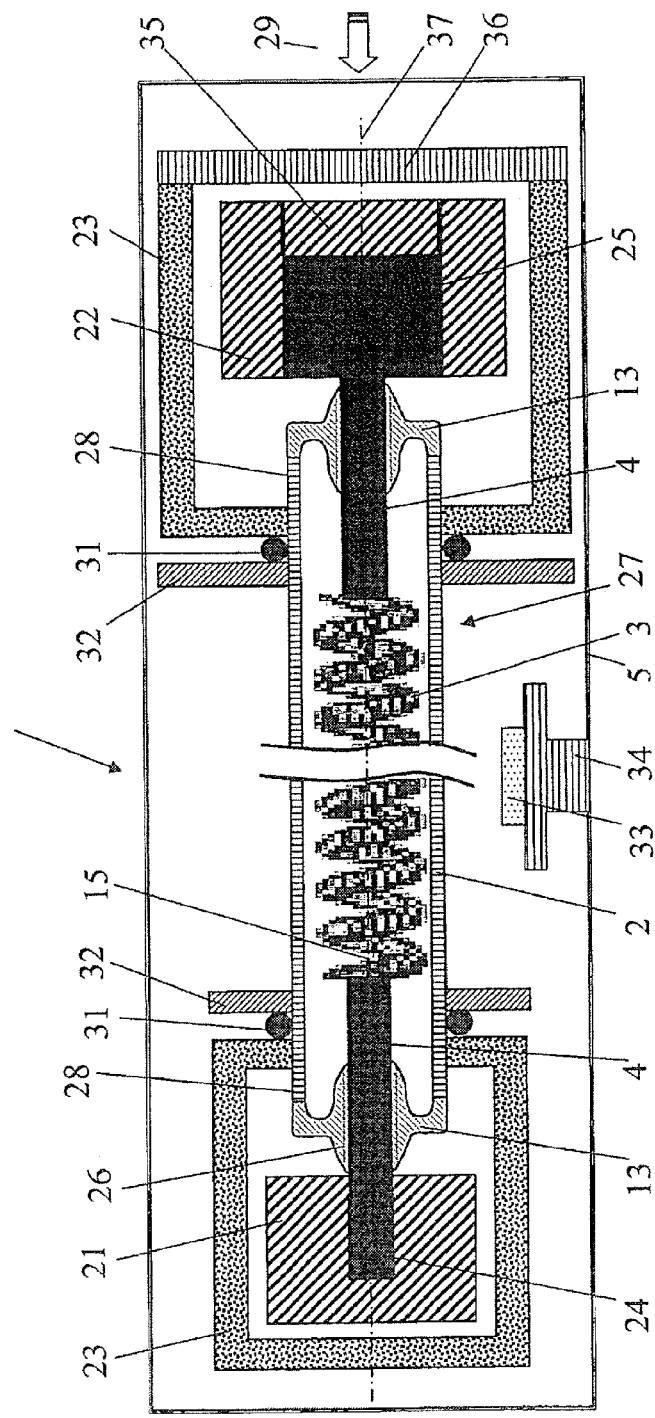
FIG. 2 is a schematic representation of a second embodiment of the irradiation device according to the invention having an infrared emitter for use in a vacuum irradiation device.

FIG. 2 shows schematically a vacuum irradiation device for a rough vacuum and a fine vacuum, having a vacuum chamber 20, in which two bus bars 21, 22 are arranged in pairs. These are each provided with a sheathing 23 made of non-conductive, heat-resistant plastic, which prevents sparkovers between the bus bars 21, 22 and the surroundings.

In the sheathing 23 openings are formed, through each of which exactly one emitter tube 2 passes, wherein the bus bars 21, 22 lying in the interior of the sheathing 23 also have, axial to the opening, a mount for the first and second bases 24, 25 of the IR emitter 27.

The bus bars 21, 22 have a rectangular profile: they are 660 mm in length and 20 mm in width and height and they are made of a copper alloy having a low admixture of silver. In these bus bars, holes are formed at the provided positions of the emitter for holding the emitter connections. The holes are formed at a distance of 100 mm. In addition, at the ends at a distance to the outermost hole there are additional holes for two additional, edge-reinforcing emitters. The second bus bar 22 provides, seen in the direction of the emitter longitudinal axis 37, an opening that can be closed with the closure piece 35. The opening width of the opening equals 12 mm. The inner diameter of the mount for the second base 25 within the bus bar 22 is 11 mm.

IR emitters 27 having a sufficiently long, non-heated area of typically 50 mm can now be mounted between the bus bars 21, 22. The type of mounting of an IR emitter 27 will be explained below using three variants:

Variant 1

Here, the IR emitters 27 provided on both sides with the bases 24, 25 are first inserted on one side into the sheathing 23 of the one bus bar 21 enclosing the emitter tube tightly, and in this way is introduced with its axially attached base 24 into the contact area of the bus bar 21 provided for holding it.

Then, on the other side, the entire unit of the sheathing 23 and the bus bar 22 is placed on the opposite emitter end.

Variant 2

The IR emitters 27 are shifted by the second bus bar 22 in the direction of the block arrow 29, so that they are in position—that is, their bases 24 are inserted into the first bus bar 21 and the emitter tube 2 is located in the plastic sheathing 23—the bus bar 22 can then be connected on the second side to the emitter bases 25 and the sheathings 23 are closed with the closure 36.

Variant 3

As an alternative, one side of the electrical contacting is designed as a star point (of a star circuit) or as a zero conductor, so that the potential difference between this bus bar and the chamber is so low that no sheathing is required for preventing sparkovers. Here, the emitters can be electrically contacted openly by conventional means.

The infrared emitters 27 used for the above variants 1 to 3 correspond in their basic construction to that described above with reference to Example 1, so that identical reference symbols are used for identical or equivalent parts and components. In the actual application, the IR emitters 27 have an axially symmetric emitter tube 2 made of quartz glass having a round cross section and an outer diameter of 10 mm and a length of 1000 mm with non-deformed ends. The emitter tube 2 encloses a coil-shaped heating filament 3 made of tungsten having a (heated) length of 900 mm, whose ends are each welded with an electrical connection pin 4 also made of tungsten. The connection pins 4 are led out from the opposing open end sides of the emitter tube 2 over a length of approximately 10 mm and connected to the sleeve-shaped contacts 24, 25.

The (non-heated) ends 28 of the infrared emitter 27 are also sealed from the plastic sheathing 23 of the bus bars 21, 22 by O-rings 31 made of Viton®. For thermal shielding, reflective contact plates 32 are provided that center the O-rings 31 and press them against the emitter tube 2. The O-rings 31 are thus used simultaneously for the mechanical support and fixing of the infrared emitter 27.

The open and non-deformed ends of the emitter tube 2 are closed with a sealing mass 13, through which the connection pins 4 for the heating coil 3 extend. In this case, the sealing mass 13 involves the following two transition glasses. The transition glass "Glass 8449" has a thermal expansion coefficient of $4.5 \times 10^{-6} \, K^{-1}$ and contacts the tungsten connection pin 4 directly. The transition glass "Glass 8448" has a thermal expansion coefficient of $3.8 \times 10^{-6} \, K^{-1}$ and lies between the layer of glass "Glass 8449" and the end side of the quartz glass emitter tube 2.

Inside the vacuum chamber 20 there is a mount 34 for a substrate 33 to be irradiated.

The production of the seal between the tungsten connection pin 4 and the inner walls of the emitter tube 2 will be explained in more detail below.

In a first step, the circular tungsten connection pin 4 is cleaned and deoxidized in acid. Then, in a glass-blowing process, a thin layer 26 of the transition glass 'Glass 8449" is placed around the entire periphery of the connection pin 4. The connection pin 4 is then welded with the heating coil 3—also cleaned in advance. Here, care must be taken that there is no oxide layer before the deposition of the glass layer 26 on the tungsten. For this purpose, the process is performed in reducing environmental conditions or alternatively the connection pin 4 is heated high enough that the volatile oxides of tungsten then evaporate.

Then, the emitter tube 2 is held on one side in a turning machine and the connection pin 4 and heating coil 3 are held in the opposite chuck and inserted coaxially and exactly centered into the emitter tube 2. The support made of transition glass on the connection pin 4 is lower than the inner diameter of the emitter tube 2, so that the support can be pushed into the emitter tube 2. Then, in a glass-blowing process, while the emitter tube 2 and connection 4 rotate, a layer of the transition glass "Glass 8448" is deposited between the existing support 26 and the inner walls of the emitter tube 2 with the formation of a coupling-shaped transition 13 and thus the end side of the emitter tube is closed gas-tight, without producing a significant deformation of the emitter tube 2. In an equivalent manner, the seal and current feed-through are produced on the opposite end side.

The coupling-shaped transition 13 of the sealing mass here runs starting from the lateral surface of the connection pin 4, where it forms a layer enveloping the connection pin like a sleeve, in an arc to the end side of the emitter tube and intersects this end side of the emitter tube in an orientation in the direction of the emitter tube longitudinal axis 15. The connection pin 4 projects through the center of the "coupling" of the transition 13 and is surrounded on both sides by the sleeve-shaped layer of the sealing mass.

Then the emitter tube 2 is filled via a (previously attached) feed port with a halogen gas-free filler gas, such as argon or noble gas, and the electrical contacting of the connection pins is prepared. The exact central guidance of the power feed-through allows a simple, space-saving plug-in connection for the electrical connection.

Other alkali-free glasses, typically borosilicate glasses having a specific thermal expansion coefficient, which lies between that of tungsten and that of quartz glass, can also be used to construct the seal between the tungsten connection pin 4 and the emitter tube 2. More specifically, the thermal expansion coefficient should lie between $0.9 \cdot 10^{-6}$ and $3.0 \cdot 10^{-6}$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An irradiation device comprising a housing (5) having an interior chamber and an infrared emitter (1; 27) arranged therein, the emitter having an emitter tube (2) made of a high silica content glass, having a circular cross section and defined outer diameter, and having a linear or coil-shaped heating filament (3) arranged therein, the filament being provided with electrical connection elements (4) made of a metallic material, the connection elements being guided out from the emitter tube (2) through a seal (13), the emitter tube having two ends, at least one of which ends (8; 28) extends into an outer space separated in a fluid-tight way from the interior chamber by a sealing element (11; 31) contacting the emitter tube (2) on the outside, wherein the at least one emitter tube end (8; 28) also has a circular cross section and the defined outer diameter, and wherein a seal (13) is provided between the electrical connection element (4) and the emitter tube (2), the seal comprising at least one transition glass having a thermal expansion coefficient lying between respective thermal expansion coefficients of the metallic material and the high silica content glass.

2. The irradiation device according to claim 1, wherein the infrared emitter (1; 27) is a short-wave infrared emitter.

3. The irradiation device according to claim 1, wherein the emitter tube (2) contains a halogen-free filler gas.

4. The irradiation device according to claim 1, wherein the emitter tube (2) contains a getter substance.

5. The irradiation device according to claim 4, wherein the getter substance is selected from the group consisting of niobium, zirconium, tantalum, phosphorus, barium, and compounds of these substances.

6. The irradiation device according to claim 1, wherein the emitter tube (2) contains a filler gas such that an internal pressure of at least 1 MPa is established under operating conditions.

7. The irradiation device according to claim 1, wherein the at least one emitter tube end (8; 28) has a surrounding end surface, and wherein the seal (13) is realized between the connection element (4) and the end surface.

8. The irradiation device, according to claim 1, wherein the heating filament (3) comprises tungsten or a tungsten-based alloy, and wherein the electrical connection element (4) comprises tungsten, a tungsten-based alloy, molybdenum, or a molybdenum-based alloy.

9. The irradiation device according to claim 1, wherein the electrical connection elements (4) have a circular cross section at least in a region of the seal and have a diameter of at least 1.5 mm.

10. The irradiation device according to claim 9, wherein the electrical connection elements (4) have diameter of at least 2.0 mm.

11. The irradiation device according to claim 1, wherein multiple infrared emitters (1; 27) are arranged next to one another in the housing (5) and a bus bar (21; 22) is provided in an outer region for mounting and electrical contacting of the infrared emitter (1; 27).

12. The irradiation device according to claim 11, wherein first and second bus bars (21; 22) are provided, wherein the first bus bar (21) has a mount for a first base (24) of the infrared emitter (1; 27) and the second bus bar (22) has a mount for a second base (25) of the infrared emitter (1; 27), and wherein an opening is provided in a direction of an infrared emitter longitudinal axis (37), the opening having an opening width at least as large as the outer diameter of the emitter tube (2).

13. The irradiation device according to claim 12, wherein the mount for the second base (25) has an inner diameter corresponding to an inner diameter of the opening.

14. The irradiation device according to claim 11, wherein one side of the electrical contact is constructed as a star point of a star circuit or as a zero conductor.

15. The irradiation device according to claim 14, wherein the interior chamber is constructed so that it can be evacuated.

16. The irradiation device according to claim 1, wherein the device is constructed as a portable irradiation device for cosmetic purposes.

17. The irradiation device according to claim 16, further comprising a cooling device for the infrared emitter (1; 27)

and an optical conductor (9) for transmitting infrared radiation emitted from the infrared emitter (1; 27).

18. The irradiation device according to claim 17, wherein the optical conductor (9) is part of the housing (5).

19. The irradiation device according to claim 1, wherein the interior chamber has a mount (34) for a substrate (33) to be irradiated.

* * * * *